(12) United States Patent
Ise et al.

(10) Patent No.: US 12,162,129 B2
(45) Date of Patent: Dec. 10, 2024

(54) WORK MACHINE

(71) Applicant: Koki Holdings Co., Ltd., Tokyo (JP)

(72) Inventors: Naoto Ise, Ibaraki (JP); Kenichi Matsunaga, Ibaraki (JP); Keisuke Maeda, Ibaraki (JP); Masahide Imayoshi, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 76 days.

(21) Appl. No.: 17/924,666

(22) PCT Filed: May 7, 2021

(86) PCT No.: PCT/JP2021/017586
§ 371 (c)(1),
(2) Date: Nov. 10, 2022

(87) PCT Pub. No.: WO2021/230172
PCT Pub. Date: Nov. 18, 2021

(65) Prior Publication Data
US 2023/0182279 A1 Jun. 15, 2023

(30) Foreign Application Priority Data
May 14, 2020 (JP) .................................. 2020-085117

(51) Int. Cl.
*B25F 5/02* (2006.01)
*B23D 47/12* (2006.01)
(52) U.S. Cl.
CPC ................ *B25F 5/02* (2013.01); *B23D 47/12* (2013.01)

(58) Field of Classification Search
CPC .................................. B25F 5/02; B23D 47/12
See application file for complete search history.

(56) References Cited

U.S. PATENT DOCUMENTS 4,555,849 A * 12/1985 Ando ........................ B27B 9/00
320/112
4,847,513 A * 7/1989 Katz ...................... H02K 23/66
30/DIG. 1

(Continued)

FOREIGN PATENT DOCUMENTS

JP 2017124462 7/2017
JP 2018065222 4/2018

(Continued)

OTHER PUBLICATIONS

International Search Report (Form PCT/ISA/210) of PCT/JP2021/017586, mailed on Jul. 6, 2021, with English translation thereof, pp. 1-4.

*Primary Examiner* — Lucas E. A. Palmer
(74) *Attorney, Agent, or Firm* — JCIPRNET

(57) ABSTRACT

A cutting tool 10 comprises a housing 30, and a handle 50 connected to the housing 30. The handle 50 comprises: a grip part 51; a first connection part 52 extending from one end of the grip part 51 toward a front side and fixed to a main body housing 32 of the housing 30; and a second connection part 53 extending from the other end of the grip part 51 toward the front side and fixed to the main body housing 32. Thus, a loop structure S is formed by the housing 30 and the handle 50. Then, a battery pack 100 to be attached to a battery attachment and detachment part 42 of a motor housing 40 is disposed in the loop structure S.

23 Claims, 10 Drawing Sheets

(56) References Cited

U.S. PATENT DOCUMENTS

| | | | | |
|---|---|---|---|---|
| 6,329,788 B1* | 12/2001 | Bailey, Jr. | ............... | B25F 5/02 |
| | | | | 307/43 |
| 8,424,213 B2* | 4/2013 | Fukinuki | ................ | B27B 9/00 |
| | | | | 30/388 |
| 8,869,912 B2* | 10/2014 | Roßkamp | ............ | A01G 3/053 |
| | | | | 173/217 |
| 9,224,995 B2* | 12/2015 | Martinsson | ......... | H01M 50/213 |
| 10,105,832 B2* | 10/2018 | Martinsson | ............. | B27B 17/00 |
| 11,219,957 B2* | 1/2022 | Numata | ................. | B25F 5/008 |
| 2003/0037445 A1* | 2/2003 | Fey | ..................... | B23D 47/126 |
| | | | | 30/388 |
| 2004/0049926 A1* | 3/2004 | Miklosz | ................ | B25F 5/02 |
| | | | | 30/388 |
| 2011/0214546 A1* | 9/2011 | Inayoshi | ............ | B23D 59/006 |
| | | | | 83/168 |
| 2012/0066916 A1* | 3/2012 | Heinzelmann | ......... | B25F 5/008 |
| | | | | 173/217 |
| 2013/0097878 A1* | 4/2013 | Naito | .................... | B23D 47/12 |
| | | | | 30/340 |
| 2017/0120436 A1* | 5/2017 | Rudolph | ............... | B23D 45/16 |
| 2018/0361562 A1* | 12/2018 | Baxivanelis | ........... | B23D 45/16 |
| 2018/0369939 A1* | 12/2018 | Zimmerman | ......... | B23D 61/02 |
| 2018/0370015 A1* | 12/2018 | Baxivanelis | ............ | B25F 5/023 |
| 2021/0205904 A1* | 7/2021 | Schmitz | ................ | B23D 45/16 |
| 2021/0354219 A1* | 11/2021 | Fu | ......................... | B23D 45/16 |
| 2023/0330893 A1* | 10/2023 | Sumi | ..................... | B23D 45/16 |

FOREIGN PATENT DOCUMENTS

| | | |
|---|---|---|
| JP | 2018099742 | 6/2018 |
| JP | 2018187702 | 11/2018 |

\* cited by examiner

1

WORK MACHINE

CROSS-REFERENCE TO RELATED APPLICATION

This application is a 371 application of the International PCT application serial no. PCT/JP2021/017586, filed on May 7, 2021, which claims the priority benefits of Japan Patent Application No. 2020-085117, filed on May 14, 2020. The entirety of each of the above-mentioned patent applications is hereby incorporated by reference herein and made a part of this specification.

TECHNICAL FIELD

The invention relates to a work machine.

RELATED ART

In an electric tool (work machine) according to Patent Literature 1, a housing forming the outline of the tool includes a motor housing and a handle having a grip part. In the motor housing, a motor driving a circular saw blade (tip tool) is accommodated. In addition, a battery pack installation part is provided in the housing. The battery installation part is formed so that a battery pack (battery) can be installed and removed. Accordingly, by installing the battery pack to the battery pack installation part, power is supplied from the battery pack to the motor, and work can be performed. As a result, compared with an electric tool having a power cord, the workability is facilitated.

CITATION LIST

Patent Literature

[Patent Literature 1] Japanese Patent Lain-Open No. 2018-187702

SUMMARY OF INVENTION

Technical Problem

However, the electric tool still has room for improvement as indicated in the following. That is, in the electric tool, the battery pack may protrude toward the rear side with respect to the electric tool in the state where the battery pack is installed. Therefore, for example, when the electric tool in the state in which the battery pack is installed drops from the rear side, the battery pack or the battery pack installation part contacts the ground, and the battery pack or the battery pack installation part may be deformed/damaged due to such impact, and the operability may be affected. Therefore, a configuration capable of facilitating the protection performance with respect to the installed battery pack in the electric tool is desired. In addition, the position or the installation state of the battery pack may interfere with the movement during work. Therefore, it is desired that the electric tool is configured so that the installed battery pack does not affect the work. Moreover, in the electric tool, the handle gripped by the operator is also a portion protruding from the main body. Depending on how the handle is installed, it is possible that the handle is deformed/damaged when dropping, which affects the workability.

The invention has taken into consideration the above facts, and an objective of the invention is to provide a work machine reducing the deterioration of workability. As another objective, an objective of the invention is to provide a work machine capable of facilitating the protection performance with respect to the installed battery or a battery holding part (battery pack installation part). As another objective, an objective of the invention is to provide a work machine capable of reducing deformation/damage of the handle.

Solution to Problem

According to one or more embodiment of the invention, a work machine includes: a housing, accommodating a motor; a handle, connected to the housing; and a battery attachment and detachment part, provided at the housing, wherein a battery supplying power to the motor is detachably installed to the battery attachment and detachment part. The handle includes: a grip part, grippable by an operator; a first connection part, extending from an end of the grip part toward a side of the housing and connected to the housing; a second connection part, extending from an other end of the grip part toward the side of the housing and connected to the housing. The first connection part is located above the battery, and the second connection part is located below the battery.

According to one or more embodiment of the invention, in the work machine, a loop structure is formed by the handle and the housing, and the battery installed to the battery attachment and detachment part is disposed inside the loop structure.

According to one or more embodiment of the invention, in the work machine, the handle has a protect part, and the protect part, inside the loop structure, connects a longitudinal intermediate part of the first connection part and a longitudinal intermediate part of the second connection part, and is disposed between the battery installed to the battery attachment and detachment part and the grip part.

According to one or more embodiment of the invention, in the work machine, a controller controlling the motor is accommodated inside the protect part.

According to one or more embodiment of the invention, the work machine includes a tip tool connected to the motor and rotated by the motor. The tip tool is formed in a circular plate shape with an axial direction of the motor as a plate thickness direction. The grip part, the first connection part, and the second connection part, when viewed in a plan view, extend along a direction orthogonal to the axial direction of the motor.

According to one or more embodiment of the invention, in the work machine, the housing includes: a motor housing, accommodating the motor; and a main body housing, accommodating the tip tool and connected to the motor housing. The handle is fixed to the main body housing without interposing of the motor housing, and the battery attachment and detachment part is provided in the motor housing.

According to one or more embodiment of the invention, in the work machine, a direction orthogonal to an upper-lower direction is set as a first direction, and a direction orthogonal to the first direction and the upper-lower direction is set as a second direction, the motor is configured with the first direction as an axial direction, when viewed in the first direction, the motor, the battery attachment and detachment part, and the grip part are disposed in order along a first inclination direction inclined upward toward a side of the second direction, and a base slidable on a processing material is disposed on a lower side of the motor and the handle.

According to one or more embodiment of the invention, in the work machine, the motor housing, when viewed in the first direction, is formed by split housing parts split in a second inclination direction orthogonal to the first inclination direction, and a pair of housing side rail parts forming a portion of the battery attachment and detachment part and locked with the battery are provided in the split housing parts.

According to one or more embodiment of the invention, a work machine includes: a motor housing, accommodating the motor; and a circular saw blade, rotated by the motor; a base, located below the motor housing, and having an insertion hole allowing at least a portion of the circular saw blade to protrude downward; a handle, connected to the motor housing; and a battery attachment and detachment part, provided at the motor housing, wherein a battery supplying power to the motor is detachably installed to the battery attachment and detachment part. The battery attachment and detachment part is configured to support the battery in a direction oblique with respect to a direction in which a lower surface of the base extends. According to one or more embodiment of the invention, in the work machine, the battery attachment and detachment part has two battery support parts, one of the battery support parts located on an upper side is closer to a center position of the motor in a front-rear direction than an other of the battery support parts located on a lower side. According to one or more embodiments of the invention, the battery support part is a rail part extending in a left-right direction. According to one or more embodiment of the invention, in the work machine, the battery attachment and detachment part supports the battery so that a lower end of the battery is located above a lower end of the motor housing.

Effects of Invention

According to one or more embodiments of the invention, a work machine reducing the deterioration of workability can be realized.

DESCRIPTION OF EMBODIMENTS

Figure 1:
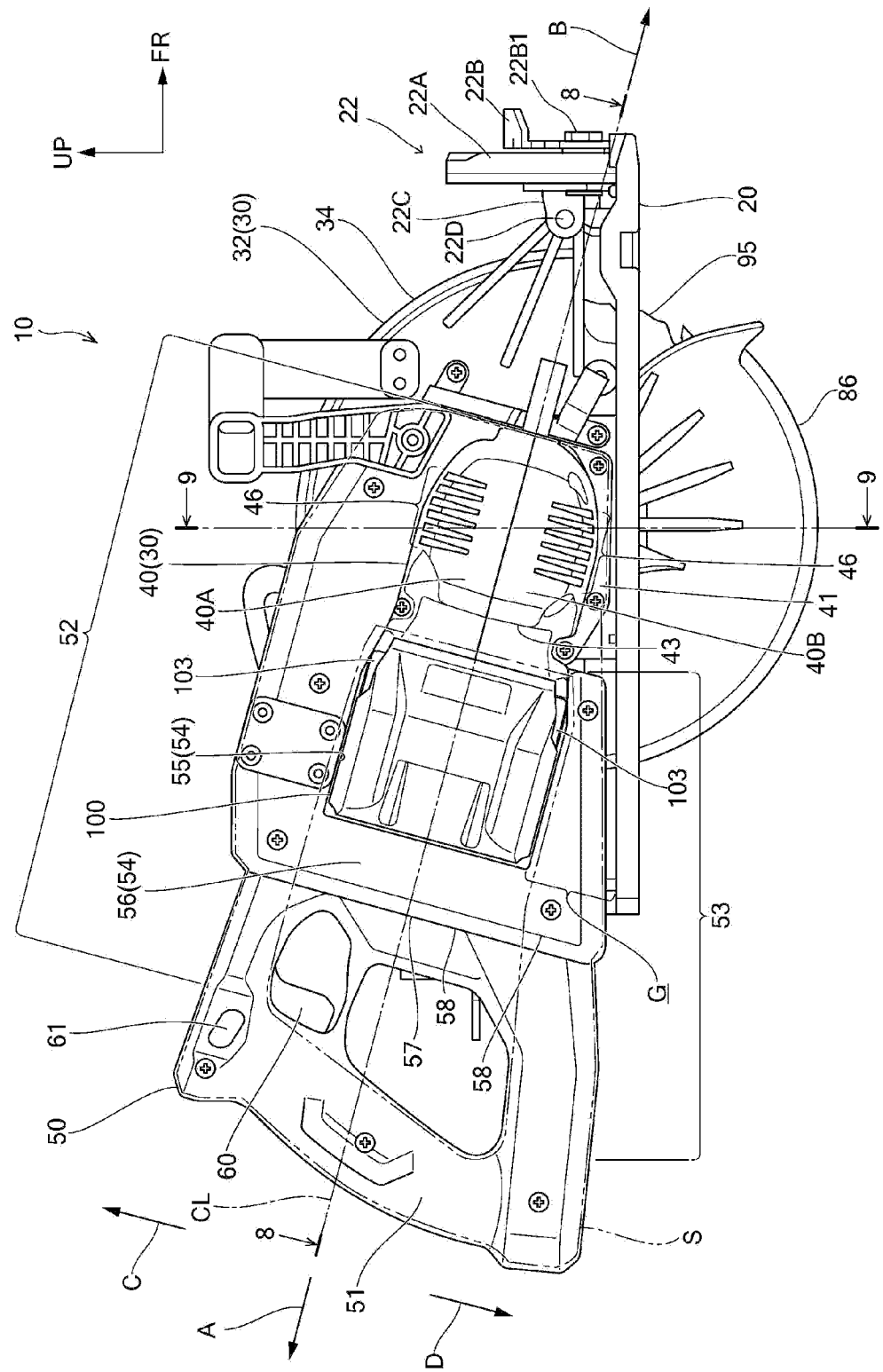
FIG. 1 is a side view from a right side, illustrating a state in which a battery pack is installed to a cutting tool according to an embodiment of the invention.

In the following, a cutting tool 10 as a "work machine" according to the embodiment is described with reference to the drawings. Arrows UP, FR, RH shown as appropriate in the drawings respectively illustrate the upper side, the front side, and the right side of the cutting tool 10. In the following description, when the directions of upper/lower, front/rear, left/right are used for description, unless otherwise specified, such directions indicate the upper/lower direction, the front/rear direction, the left/right direction of the cutting tool 10. In addition, a first inclination direction is a direction (as indicated by arrows A and B of FIG. 1) inclining upward toward the rear side, when viewed in the left-right direction, and a second inclination direction is a direction (as indicated by arrows C and D of FIG. 1) orthogonal to the first inclination direction. In addition, the left-right direction corresponds to a first direction of the invention, and the front-rear direction corresponds to a second direction of the invention.

The cutting tool 10 is configured as a tool that cuts a processing material. As shown in FIGS. 1 to 4 and 9, the cutting tool 10 includes a base 20, a housing 30, a handle 50, a motor 70 as well as a transmission mechanism 80 accommodated in the housing 30, and a controller 90 (see FIG. 6). In addition, the cutting tool 10 is configured so that a battery pack 100, as a "battery" for supplying power to the motor 70, can be installed and removed. In the following, the respective configurations of the cutting tool 10 are described.

(Regarding the base 20) The base 20 is formed in a substantially rectangular plate shape in which the upper-lower direction is set as a plate thickness direction and the front-rear direction is set as a longitudinal direction. In addition, at the time of processing by using the cutting tool 10, the base 20 is mounted on the upper side of the processing material, and the lower surface of the base 20 slides along the upper surface of the processing material.

On the left side part of the base 20, a tool insertion part 20A for disposing a saw blade 95 as a "tip tool" is formed to pass through. The tool insertion part 20A is formed in a substantially rectangular hole shape where the front-rear direction is the longitudinal direction when viewed in a plan view. That is, the tool insertion part 20A is an insertion hole for the saw blade 95 to protrude downward. Here, the saw blade 95 is in a substantially disk shape in which the left-right direction is the plate thickness direction. The central portion of the saw blade 95 is fixed, in an integrally rotatable manner, to an output shaft 81 (see FIG. 9) of the transmission mechanism 80 to be described afterwards. In addition, the saw blade 95 is disposed inside the tool insertion part 20A. The upper part of the saw blade 95 protrudes upward from the base 20, and the lower side portion of the saw blade 95 protrudes downward from the base 20. The saw blade 95 is a circular saw blade.

(Regarding the housing 30) As shown in FIGS. 2 to 5, 8, and 9, the housing 30 is disposed on the upper side of the base 20. The housing 30 is configured to include a main body housing 32 and a motor housing 40.

<Regarding the main body housing 32> The main body housing 32 includes a saw cover part 34 forming the left side portion of the main body housing 32 and a gear housing part 36 forming the right side portion of the main body housing 32.

The saw cover part 34 is formed as a member covering the upper part of the saw blade 95 from the upper side. The saw cover part 34, when viewed from the right side, is formed in a semi-circular shape convex toward the upper side and formed in a concave shape open to the lower side. Specifically, the saw cover part 34 includes an outer peripheral wall 34A extending along the peripheral direction of the saw blade 95 on the radially outer side of the saw blade 95, a right wall 34B extending from the right end of the outer peripheral wall 34A toward the radially inner side of the outer peripheral wall 34A, and a left wall 34C extending from the left end of the outer peripheral wall 34A toward the radially inner side of the outer peripheral wall 34A. The right wall 34B is formed in a substantially semi-circular plate shape convex upward when viewed from a side view, and the left wall 34C is formed in a semi-circular arced plate shape convex upward when viewed from a side view.

In addition, a pair of front and rear first fixing bosses 34D (see FIG. 5) for fixing a first connection part 52 of the handle 50 to be described afterwards are formed at the upper part of the right wall 34B of the saw cover part 34. The first fixing boss 34D is formed in a substantially cylindrical shape with the left-right direction as the axial direction, and protrudes toward the right side from the right wall 34B.

In addition, a second fixing boss 34E (see FIG. 5) for fixing a second connection part 53 of the handle 50 to be described afterwards is formed at a rear lower end in the right wall 34B of the saw cover part 34. The second fixing boss 34E is formed in a substantially cylindrical shape with the left-right direction as the axial direction, and protrudes toward the right side from the right wall 34B.

The gear housing part 36 is formed at the lower end and the intermediate part in the front-rear direction of the right wall 34B of the saw cover part 34. Specifically, the gear housing part 36 is disposed on the lower side of the first fixing boss 34D and on the front side of the second fixing boss 34E. The gear housing part 36 is formed in a bottomed substantially rectangular tube shape open to the left side and protrudes toward the right side from the right wall 34B. A support tube part 36A is formed on the bottom wall of the gear housing part 36. The support tube part 36A is formed in a substantially cylindrical part with the left-right direction as the axial direction, and the inside of the support tube part 36A passes through in the left-right direction.

In addition, the front end of the base 20 is connected to the front end of the main body housing 32 via a front side connection mechanism part 22, and the rear end of the base 20 is connected to the rear end of the main body housing 32 via a rear side connection mechanism part 24. The front side connection mechanism part 22 includes an inclination support part 22A, an inclination position fixing lever 22B, a connection part 22C, a swing shaft 22D, and an inclination shaft 22E. The inclination support part 22A has an arced guide hole 22A1 passing through in the front-rear direction. The inclination position fixing lever 22B has a fixing shaft 22B1. The fixing shaft 22B1 extends in the front-rear direction so as to penetrate through the guide hole 22A1. The rear side connection mechanism part 24 has a link 24A and a protrusion amount fixing lever 24B. The link 24A has an arced guide hole 24A1. The protrusion amount fixing lever 24B has a fixing shaft 24B1. The fixing shaft 24B1 is inserted through the guide hole 24A1. The front side connection mechanism part 22 and the rear side connection mechanism part 24 realize an inclination mechanism and a cutting depth adjustment mechanism. The inclination mechanism is a mechanism making the angle of the saw blade 95 with respect to the lower surface of the base 20 adjustable (changeable). The cutting depth adjustment mechanism is a mechanism making the protrusion amount of the saw blade 95 protruding downward from the lower surface of the base 20 adjustable (changeable). The main body housing 32 is relatively rotatable with respect to the base 20 with the inclination shaft 22E extending in the front-rear direction as the center, and is capable of inclining the saw blade 95 in the left-right direction through rotation. The inclination position of the main body housing 32 (saw blade 95) can be fixed by operating the inclination position fixing lever 22B. That is, by operating the inclination position fixing lever 22B, the fixing force can be adjusted to be weaker. What is shown in the drawing is a state in which the inclination angle is 0 degrees, and the saw blade 95 is vertical to the lower surface of the base 20. In addition, the main body housing 32 is rotatable with respect to the base 20 with the swing shaft 22D extending in the left-right direction as the center, and is capable of adjusting (changing) the protrusion amount of the saw blade 95 protruding downward from the lower surface of the base 20 through rotation. What is shown in the drawing is a state in which the protrusion amount of the saw blade 95 from the lower surface of the base 20 is the maximum. When observed with the main body housing 32 as reference, the base 20 is configured to be movable toward the lower side along the peripheral direction of the saw blade 95 by using the rear side connection mechanism part 24 and the swing shaft 22D.

<Regarding the motor housing 40> As shown in FIGS. 1 to 9, the motor housing 40 is configured as a member accommodating the motor 70 to be described afterwards. The motor housing 40 is formed in a bottomed tube shape open to the left side, and is disposed on the right side of the gear housing part 36. A pair of flange parts 41 are formed at the left end of the motor housing 40. The flange parts 41 respectively protrude toward a side (the side of the arrow C in FIG. 6) in the second inclination direction and the other side (the side of the arrow D in FIG. 6) in the second inclination direction. In addition, the flange part 41 is fastened and fixed to a sidewall part of the gear housing part 36. Accordingly, on the upper side of the base 20, the motor housing 40 protrudes toward the right side from the main body housing 32.

The motor housing 40 has a battery attachment and detachment part 42 as a "battery attachment and detachment part". At the left side portion (opening side portion) of the motor housing 40, the battery attachment and detachment part 42 is raised toward a side (the side of the arrow A of FIG. 6) in the first inclination direction. Accordingly, when viewed in the left-right direction, the motor housing 40 is disposed along the first inclination direction, and is inclined with respect to the front-rear direction. Specifically, the front end of the motor housing 40 is disposed in adjacency with the upper side of the base 20, and the battery attachment and detachment part 42 of the motor housing 40 is disposed apart toward the upper side with respect to the base 20 (see FIG. 7). In addition, as described above, the battery attachment and detachment part 42 is raised toward the side in the first inclination direction at the left side portion of the motor housing 40. Therefore, at the right end of the motor housing 40, a scooped part 43 (see FIGS. 2 and 8) open to the side in the first inclination direction and the right side is formed.

Figure 6:
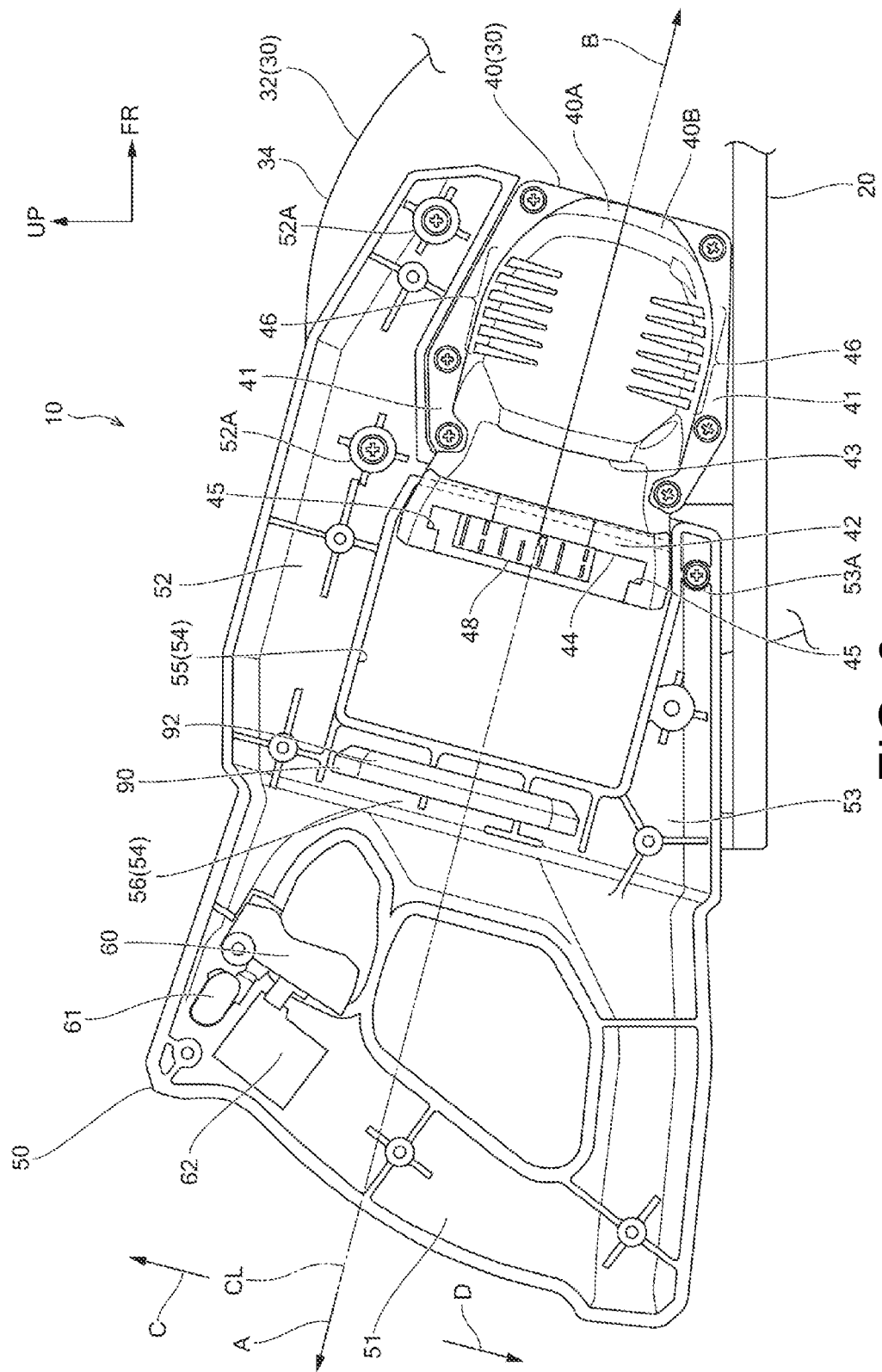
FIG. 6 is a side view from the right side, illustrating the cutting tool shown in FIG. 1 in a state in which a handle member on the right side and a battery pack are removed.
Figure 7:
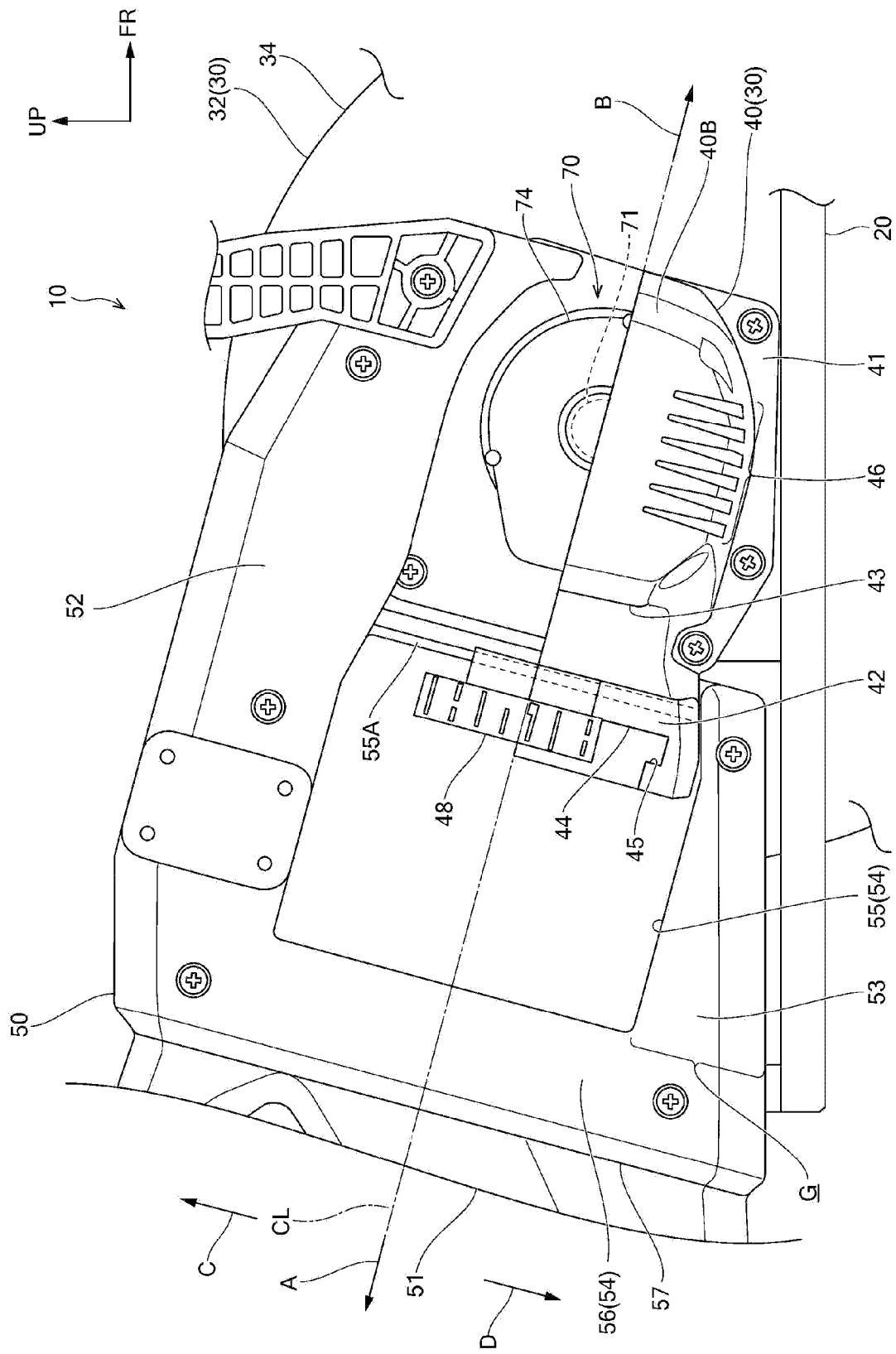
FIG. 7 is a side view from the right side, illustrating the cutting tool shown in FIG. 1 in a state in which a split housing member on a side in a second inclination direction and the battery pack are removed.
Figure 8:
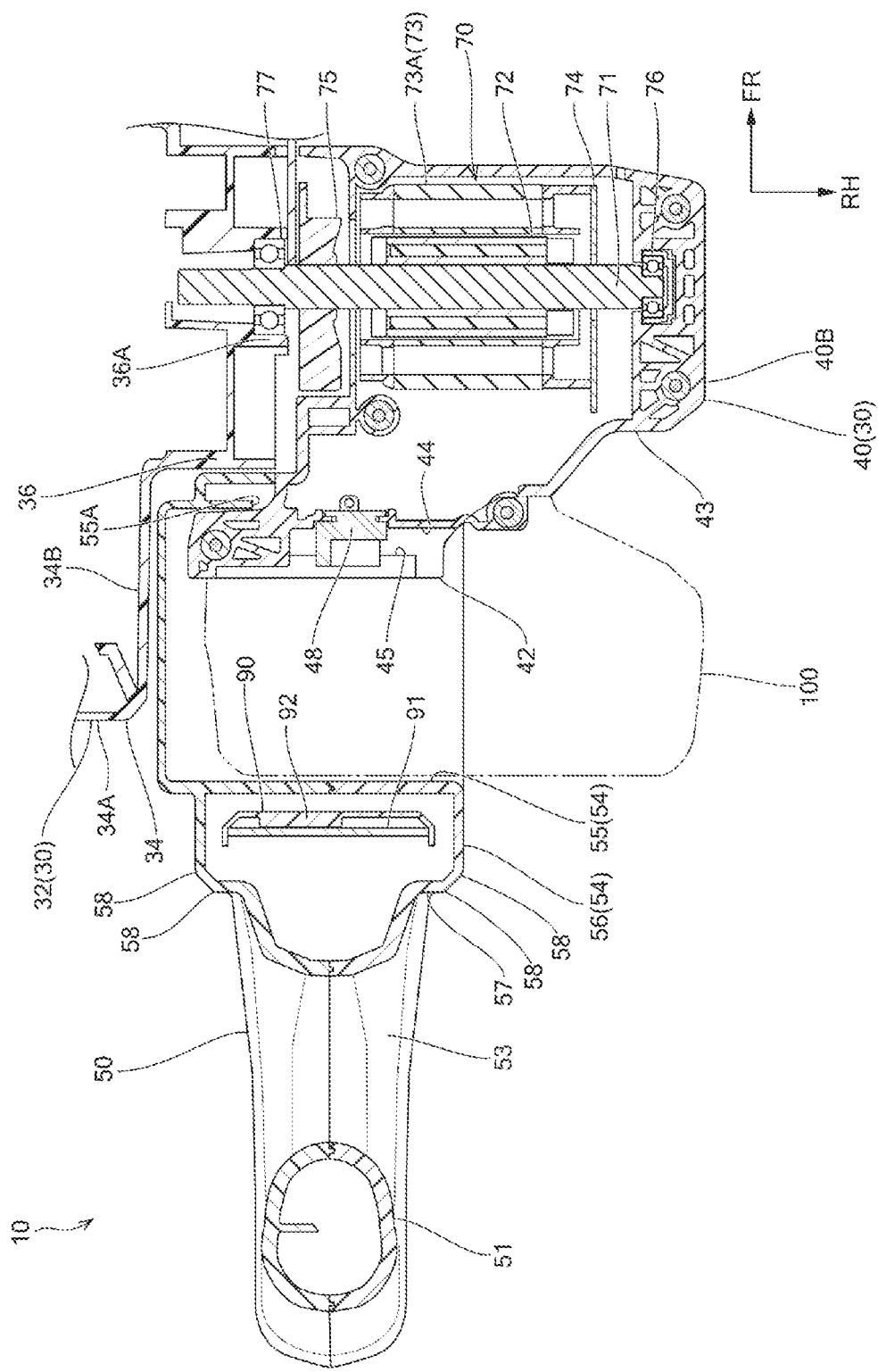
FIG. 8 is a cross-sectional view (cross-sectional view taken along a 8-8 line of FIG. 1) illustrating the inside of the cutting tool shown in FIG. 1 and viewed from a side in the second inclination direction.

As shown in FIGS. 6 to 8, a battery insertion part 44 open to the side in the first inclination direction and the right side is formed at the battery attachment and detachment part 42.

In addition, a pair of housing side rail parts 45 are formed on the sidewalls on the two sides in the second inclination direction with respect to the battery insertion part 44 in the battery attachment and detachment part 42. The two housing side rail parts 45 are respectively provided on the upper side and the lower side of the battery attachment and detachment part 42. That is, the housing side rail part 45 on the upper side is located above the center of the battery attachment and detachment part 42, and the housing side rail part 45 on the lower side is located below the center of the battery attachment and detachment part 42. The housing side rail part 45 includes a groove-like portion open to the inner side in the second inclination direction, and extends in the left-right direction. That is, the housing side rail part 45 on the upper side has a groove open to the lower direction, and the housing side rail part 45 on the lower side has a groove open to the upper direction. In addition, a connector 48 is provided in the battery attachment and detachment part 42. The connector 48 is exposed from the battery insertion part 44 toward the side in the first inclination direction, and is electrically connected with the controller 90 to be described afterwards.

As shown in FIGS. 1 to 7, multiple intake holes 46 are respectively formed at the corners on a side in the second inclination direction and the other side in the second inclination direction at the right end of the motor housing 40. The intake holes 46 extend in the left-right direction from the bottom wall and through the sidewall of the motor housing 40, and are arranged side-by-side in the first inclination direction.

Figure 5:
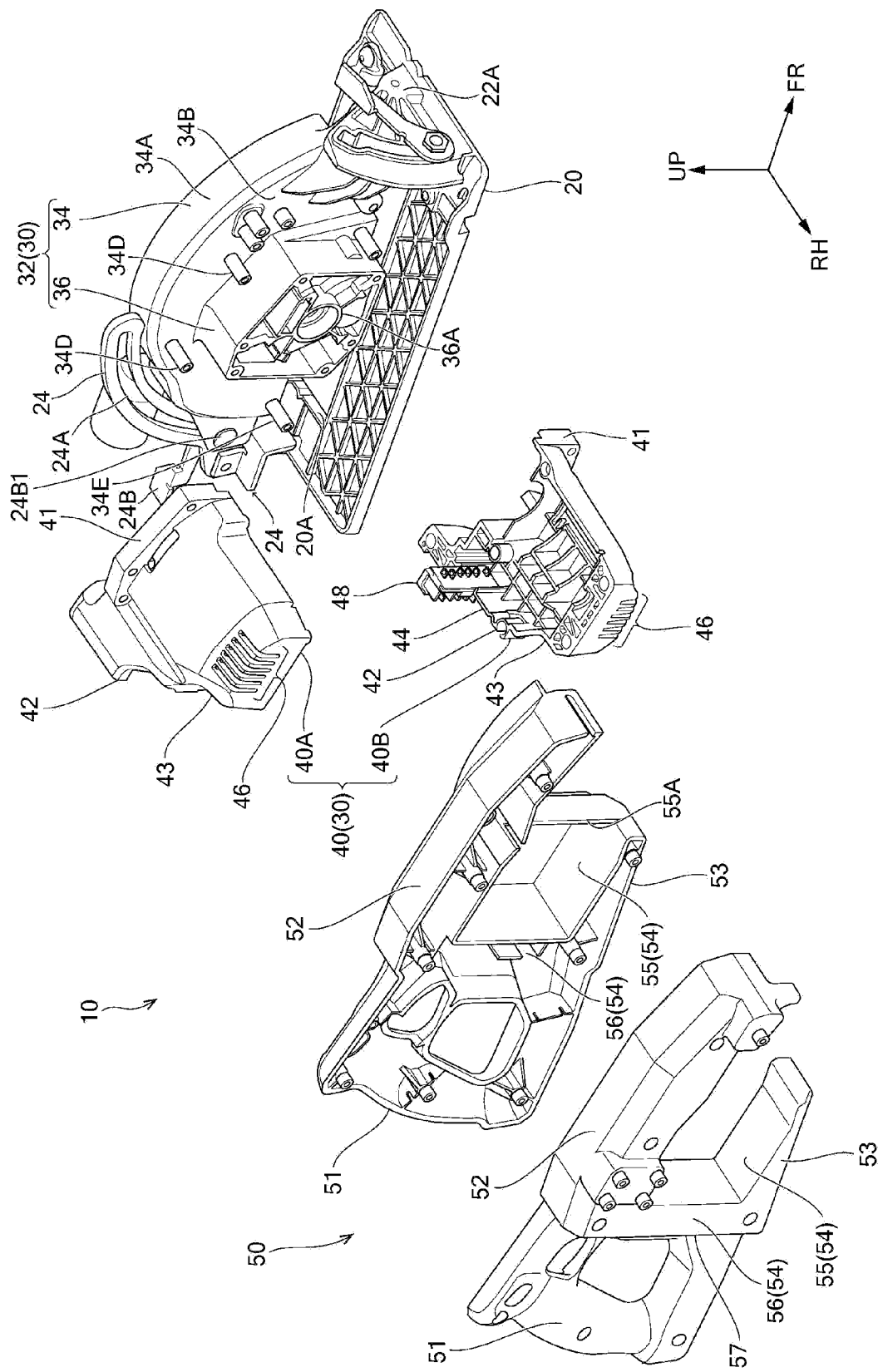
FIG. 5 is an exploded perspective view illustrating a state in which a motor housing and a handle shown in FIG. 3 are separated from a main body housing.

As shown in FIG. 5, the motor housing 40 is split into two in the second inclination direction at the central part of the motor housing 40 in the second inclination direction. That is, the motor housing 40 is formed by a pair of split housing parts 40A and 40B, and mating parts of the split housing parts 40A and 40B are formed along the first inclination direction. Specifically, the mating parts of the split housing parts 40A and 40B, when viewed in a side view, are disposed along a reference line CL (see FIGS. 1, 6, and 7) passing through the axial center of a rotation shaft 71 of the motor 70 to be described afterwards along the first inclination direction. The battery attachment and detachment part 42 is formed by mating the pair of split housing parts 40A and 40B. One of the pair of housing side rail parts 45 is provided at the split housing part 40A, and the other is provided at the split housing part 40B. The housing parts 40A and 40B form a symmetric configuration with the mating parts (mating surface) as reference. With the housing parts 40A and 40B forming a configuration symmetric to each other, the configuration of the battery attachment and detachment part 42, etc., which requires a pair of rail parts can be simplified, and high durability can be secured. Since the housing parts 40A and 40B are in a configuration symmetric to each other, the rigidity of the battery attachment and detachment part 42 can be secured. Since the mating parts of the housing parts 40A and 40B are along the reference line CL, the battery attachment and detachment part 42 (the direction which the battery attachment and detachment part 42 faces) is inclined with respect to the front-rear direction. Specifically, the battery attachment and detachment part 42 (the direction which the battery attachment and detachment part 42 faces) is configured to face rearward and upward. In other words, the motor housing 40 supports the battery pack 100 in a direction that is oblique with respect to the direction (front-rear direction) in which the lower surface of the base 20 extends. Accordingly, a configuration in which the lower end of the battery pack 100 does not protrude downward from the lower end of the motor housing 40 can be formed. More specifically, a configuration in which the lower end of the battery pack 100 is located above the lower end of the motor housing 40 can be formed. The center position of the battery attachment and detachment part 42 is located above the center position of the motor 70. The center position of the battery attachment and detachment part 42 is located behind the center position of the motor 70. In addition, the center position of the battery pack 100 is located below the upper end of the motor housing 40. By doing so, the battery pack 100 can be configured to not excessively protrude upward. Such position relationship is present in a state in which the protrusion amount of the saw blade 95 is the maximum. When it is assumed that the lower end of the battery pack 100 protrudes downward with respect to the lower end of the motor housing 40, it is possible that the battery pack 100 contacts the base 20 or the processing material and it becomes difficult to secure the protrusion amount of the saw blade 95. However, in the cutting tool 10 according to the embodiment, the lower end of the battery pack 100 supported by the motor housing 40 is located above the lower end of the motor housing 40. Therefore, the assemblability is facilitated by integrating the battery attachment and detachment part 42 and the motor housing 40, and the influence of the battery pack 100 on the protrusion amount of the saw blade 95 can be reduced. Such configuration is realized by locating the housing side rail part 45 on the upper side toward the front with respect to the housing side rail part 45 on the lower side in the configuration in which the battery pack 100 is located behind the motor housing 40. It is noted that, by making the housing side rail part 45 on the upper side behind the housing side rail part 45 on the lower side in the configuration in which the battery pack 100 is located in front of the motor housing 40, it is also possible to suppress the influence of the battery pack 100 on the protrusion amount of the saw blade 95. That is, by configuring the battery support part on the upper side (the housing side rail part 45 on the upper side) to be closer to the center position (rotation shaft 71) of the motor 70 in the front-rear direction than the battery support part on the lower side (the housing side rail part 45 on the lower side) when viewed in the left-right direction, the influence of the battery pack 100 on the protrusion amount of the saw blade 95 can be suppressed.

(Regarding the handle 50) As shown in FIGS. 1 to 8, the handle 50 is disposed on the right side of the saw cover part 34 of the main body housing 32. In addition, the handle 50 is configured by handle members split into two in the left-right direction, and is formed by assembling the split handle members.

When viewed from the right side, the handle 50 is formed in a substantially U shape open to the front side. Specifically, the handle 50 includes a grip part 51 forming the rear end of the handle 50, a first connection part 52 extending from the grip part 51 toward the front side and forming the upper end of the handle 50, and a second connection part 53 extending from the grip part 51 toward the front side and forming the lower end of the handle 50.

The grip part 50 is formed as a portion gripped by the user. The grip part 51 is disposed on the rear side of the housing 30, and, when viewed in a side view, extends in a direction inclined upward toward the front side. More specifically, the grip part 51 is inclined forward to a certain extent with respect to the second inclination direction when viewed in a side view. A trigger 60 is provided at an upper end side portion of the grip part 51. The trigger 60 protrudes from the grip part 51 toward the front side and is configured to be pullable toward the rear side. In addition, in the grip part 51, a lock button 61 for locking the pulling operation of the trigger 60 is provided on the upper side of the trigger 60. It is configured that, without operating the lock button 61 provided in the grip part 51, the pulling operation of the trigger 60 cannot be performed. In addition, inside the grip part 51, a switch mechanism 62 (see FIG. 6) is provided on the rear side of the trigger 60. The switch mechanism 62 has a switch operated by the trigger 60 and not shown herein. The switch is electrically connected to the controller 90 to be described afterwards, and is configured to output an output signal in accordance with the operation state of the trigger 60 to the controller 90.

The first connection part 52 extends to the front side from the upper end of the grip part 51. More specifically, the first connection part 52 extends from the upper end of the grip part 51 toward the other side (the side of the arrow B in FIGS. 1 and 6) in the first inclination direction. In the first connection part 52 of the handle member on the left side, a pair of first fixed parts 52A (see FIG. 6) are formed at positions corresponding to the first fixing bosses 34D of the saw cover part 34. The first fixed part 52A is formed in a substantially bottomed cylindrical shape open to the left side, and protrudes toward the right side. In addition, the first fixing bosses 34D of the saw cover part 34 are inserted into the first fixed parts 52A from the left side, and the first fixed parts 52A are fastened to the first fixing boss parts 34D. Accordingly, the front end of the first connection part 52 is fixed to the saw cover part 34 on the upper side of the gear housing 36.

The second connection part 53 extends to the front side from the lower end of the grip part 51. That is, the grip part 51, the first connection part 52, and the second connection part 53, when viewed in a plan view, extend along a direction orthogonal to the left-right direction. In the second connection part 53 of the handle member on the left side, a second fixed part 53A (see FIG. 6) is formed at a position corresponding to the second fixing boss 34E of the saw cover part 34. The second fixed part 53A is formed in a substantially bottomed cylindrical shape open to the left side, and protrudes toward the right side. In addition, the second fixing boss 34D of the saw cover part 34 is inserted into the second fixed part 53A from the left side, and the second fixed part 53A is fastened to the second fixing boss part 34E. Accordingly, the front end of the second connection part 53 is fastened and fixed to the saw cover part 34 on the lower side of the battery attachment and detachment part 42 of the motor housing 40. Therefore, the front end of the first connection part 52 and the front end of the second connection part 53 are fixed to the saw cover part 34, so as to sandwich the motor housing 40 in the upper-lower direction. As a result, the motor housing 40 (the gear housing part 36), the first connection part 52, the grip part 51, and the second connection part 53 form a loop structure S (see FIG. 1).

The handle 50 has a handle intermediate part 54 connected with the longitudinal intermediate part of the first connection part 52 and the front end part and the longitudinal intermediate part of the second connection part 53. The handle intermediate part 54 is disposed in adjacency with the rear side (see FIG. 8) of the gear housing part 36 in the main body housing 32. As shown in FIGS. 5 to 8, a battery accommodation part 55 is formed at the front part of the handle intermediate part 54. The battery accommodation part 55 is formed in a concave shape open to the right side. The battery accommodation part 55 is a space surrounded by the handle intermediate part 54, the first connection part 52, and the second connection part 53. When viewed from the right side, the battery accommodation part 55 is formed in a substantially rectangular shape, and is disposed in adjacency with a side of the gear housing 36 in the first inclination direction. That is, the motor housing 40 and the battery accommodation part 55 are disposed side-by-side in the first inclination direction, and the battery accommodation part 55 is disposed inside the loop structure S.

In addition, when viewed from the right side, the battery accommodation part 55 is inclined along the first inclination direction with respect to the front-rear direction. That is, the inner peripheral surfaces of two places facing each other in the battery accommodation part 55 are disposed along the first inclination direction, and the inner peripheral surfaces of two places facing each other in the battery accommodation part 55 are disposed along the second inclination direction. Accordingly, a gap G (see FIGS. 1 and 7) between the battery accommodation part 55 and the base 20 in the upper-lower direction is set to increase toward the rear side. In addition, a notch part 55A is formed in the wall part on the other side in the first inclination direction in the opening part of the battery accommodation part 55. With the notch part 55A, the opening part of the battery accommodation part 55 is open to the other side (the side of the motor housing 40) in the first inclination direction.

In addition, a portion on a side of the motor housing 40 in the first inclination direction is disposed inside the notch part 55A of the battery accommodation part 55, and the battery attachment and detachment part 42 of the motor housing 40 is disposed inside the battery accommodation part 55. Accordingly, the connector 48 of the motor housing 40 is exposed inside the battery accommodation part 55.

In addition, a portion of the battery accommodation part 55 on the side in the first inclination direction in the handle intermediate part 54 is formed as a protect part 56. The protect part 56 extends in the second inclination direction, and connects the first connection part 52 and the second connection part 53. Accordingly, the protect part 56 is disposed between the battery accommodation part 55 and the grip part 51 in the first inclination direction.

Figure 2:
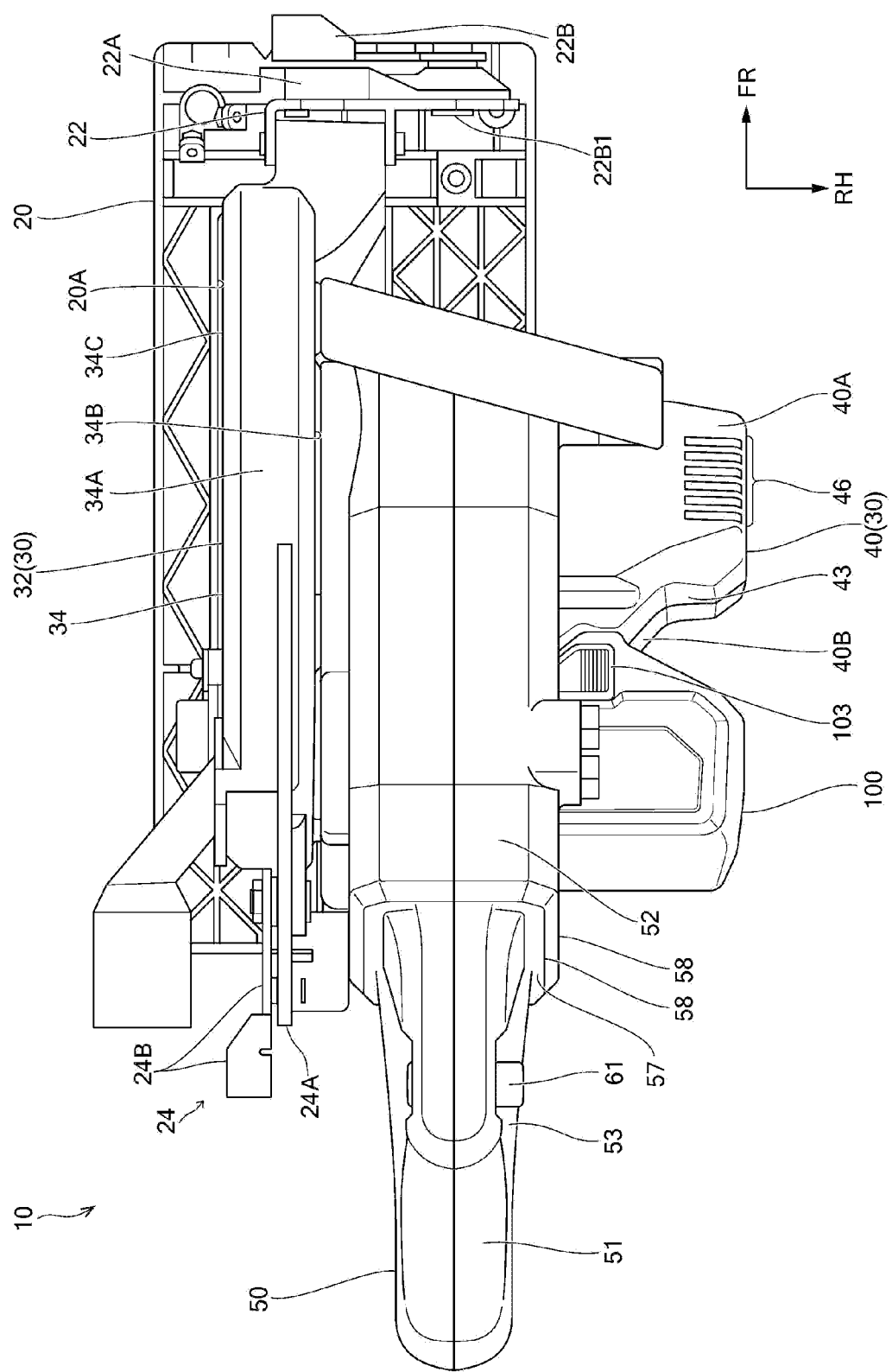
FIG. 2 is a plan view of the cutting tool shown in FIG. 1, when viewed from an upper side.

As shown in FIGS. 1, 2, and 8, a stepped part 57 is formed in the protect part 56. When viewed in the longitudinal direction of the protect part 56, the stepped part 57 is bent in a substantially crank shape, and the width dimension (dimension in the left-right direction) of the front part of the handle 50 is set to be greater than the width dimension of the rear part of the handle 50. Accordingly, on the sidewalls at the left and the right of the handle 50, a pair of bending edges 58 extending along the second inclination direction are formed in the protect part 56, and the bending edges 58 extend from the first connection part 52 to the second connection part 53.

Figure 10:
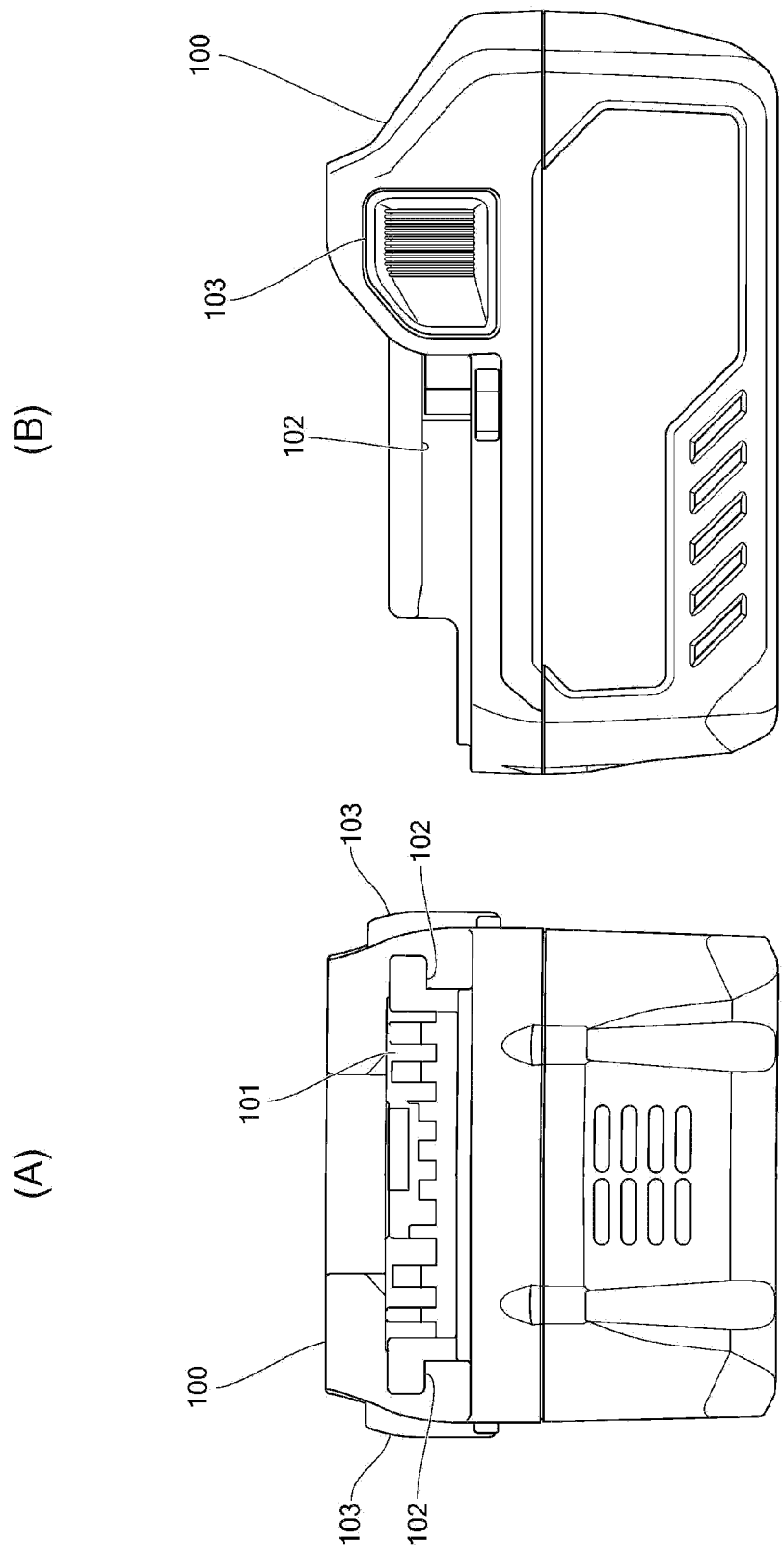
In FIG. 10, (A) is a front view illustrating the battery pack shown in FIG. 1, and (B) is a side view of the battery pack of (A).

(Battery pack 100) Here, the battery pack 100 accommodated in the battery accommodation part 55 is described. As shown in (A) and (B) of FIG. 10, the battery pack 100 is formed in a substantially rectangular parallelepiped shape. A connector part 101 is formed at the upper part of the battery pack 100. On the two ends of the connector part 101 in the width direction, battery side rail parts 102 are formed. The battery side rail part 102 is formed in a substantially inverted L shape when viewed from the front side of the battery pack, extends in the longitudinal direction of the battery pack 100, and is open to the front side.

In addition, the battery pack 100 is accommodated into the battery accommodation part 55 of the cutting tool 10 from the right side, and is installed to the battery attachment and detachment part 42 of the motor housing 40. Specifically, the housing side rail part 45 is slidably inserted into the battery side rail part 102, in the left-right direction, and the housing side rail part 45 and the battery side rail part 102 are locked in the first inclination direction. Moreover, in the state in which the battery pack 100 is installed, the connector part 101 is connected to the connector 48 of the motor housing 40, and power is supplied from the battery pack 100 to the controller 90 to be described afterwards. Accordingly, the battery pack 100 is disposed inside the loop structure S.

Moreover, a lock member 103 is each provided at the side parts of the battery pack 100. In addition, in the state in which the battery pack 100 is installed, the lock member 103 is locked with the motor housing 40, and the state in which the battery pack 100 is installed is maintained.

Figure 3:
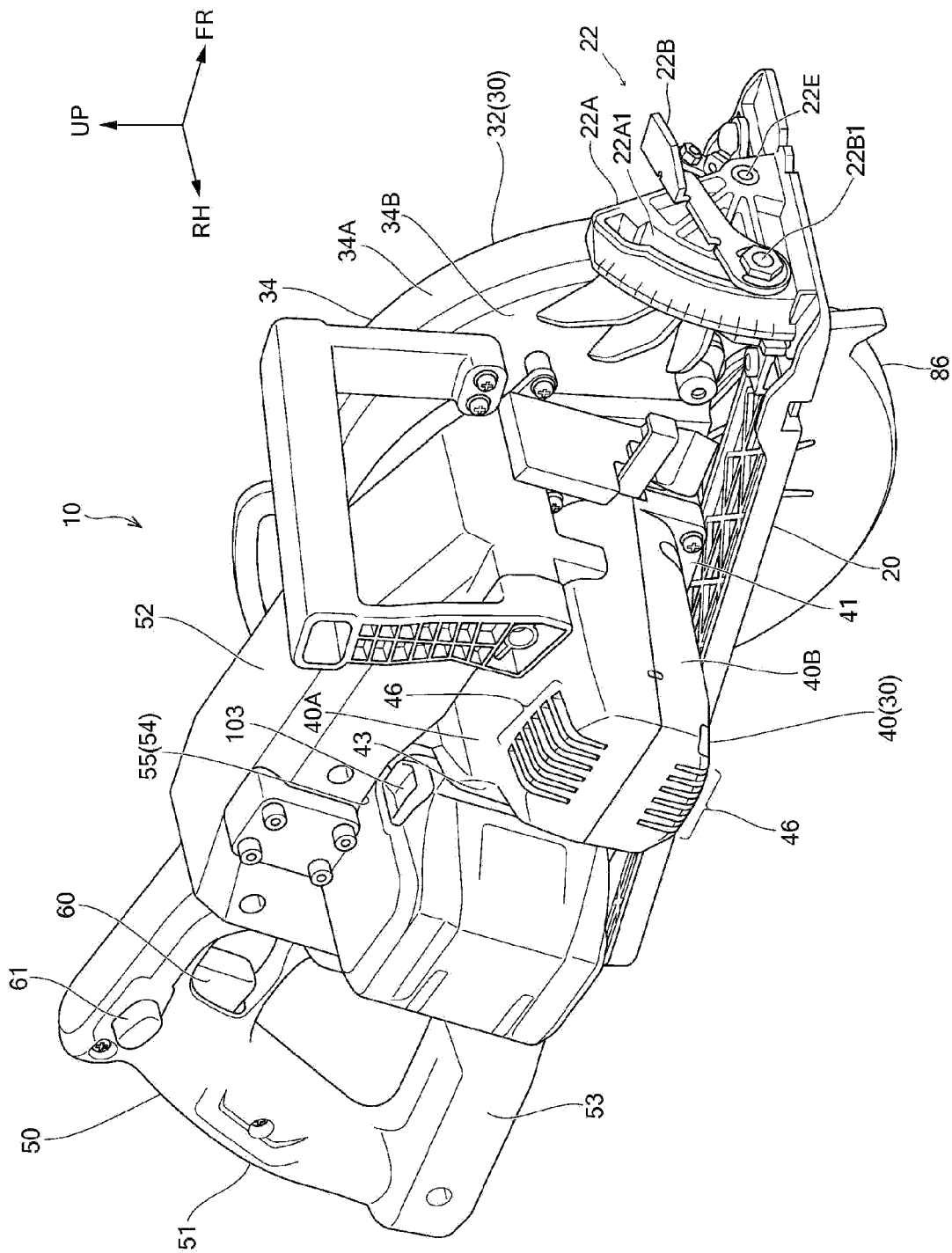
FIG. 3 is a perspective view of the cutting tool shown in FIG. 1, when viewed obliquely from the right.
Figure 4:
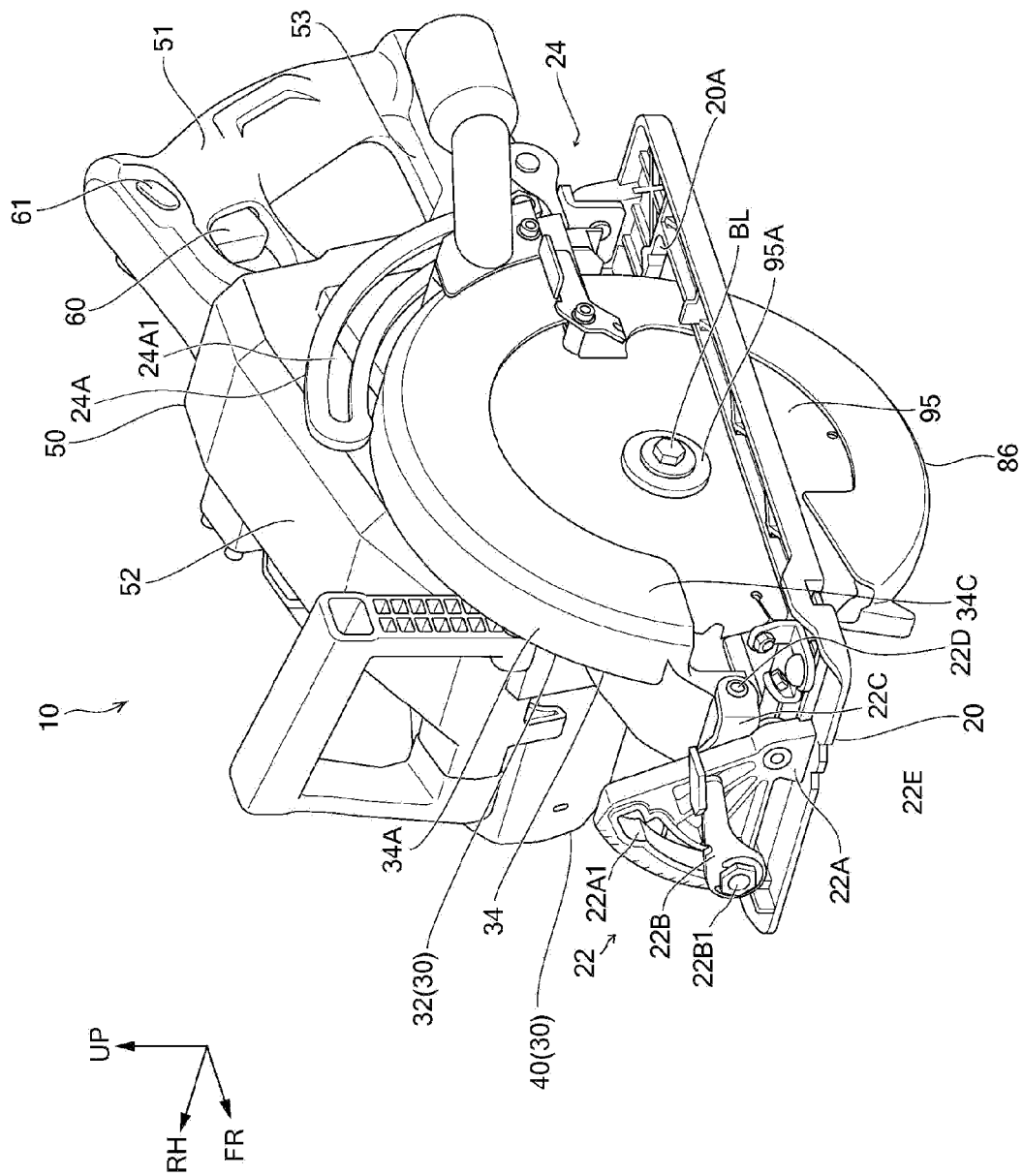
FIG. 4 is a perspective view of the cutting tool shown in FIG. 1, when viewed obliquely from the left.

Here, as shown in FIGS. 1 to 3, in the state in which the battery pack 100 is installed to the battery attachment and detachment part 42, the battery pack 100 is accommodated in the battery accommodation part 55, so that the lock members 103 are located at two side parts of the battery pack 100 in the second inclination direction. Moreover, in such state, the depth dimension of the battery accommodation part 55 is set, so that the lock members 103 are exposed to the outside of the battery accommodation part 55. The thickness dimension (dimension in the left-right direction) of the front part in the handle 50 is set, so that the right side surface of the handle 50 is disposed on the left side with respect to the lock member 103. In addition, in such state, the right end of the battery pack 100 is disposed on the left side with respect to the right end of the motor housing 40. That is, the battery pack 100 is disposed so as not to protrude to the right side with respect to the motor housing 40. In the case where the lock member 103 is operated by the right hand to install or detach the battery pack 100, the right hand, except for the thumb, easily supports the battery pack 100 from the bottom. Therefore, it is easy to install or detach the battery pack 100.

Figure 9:
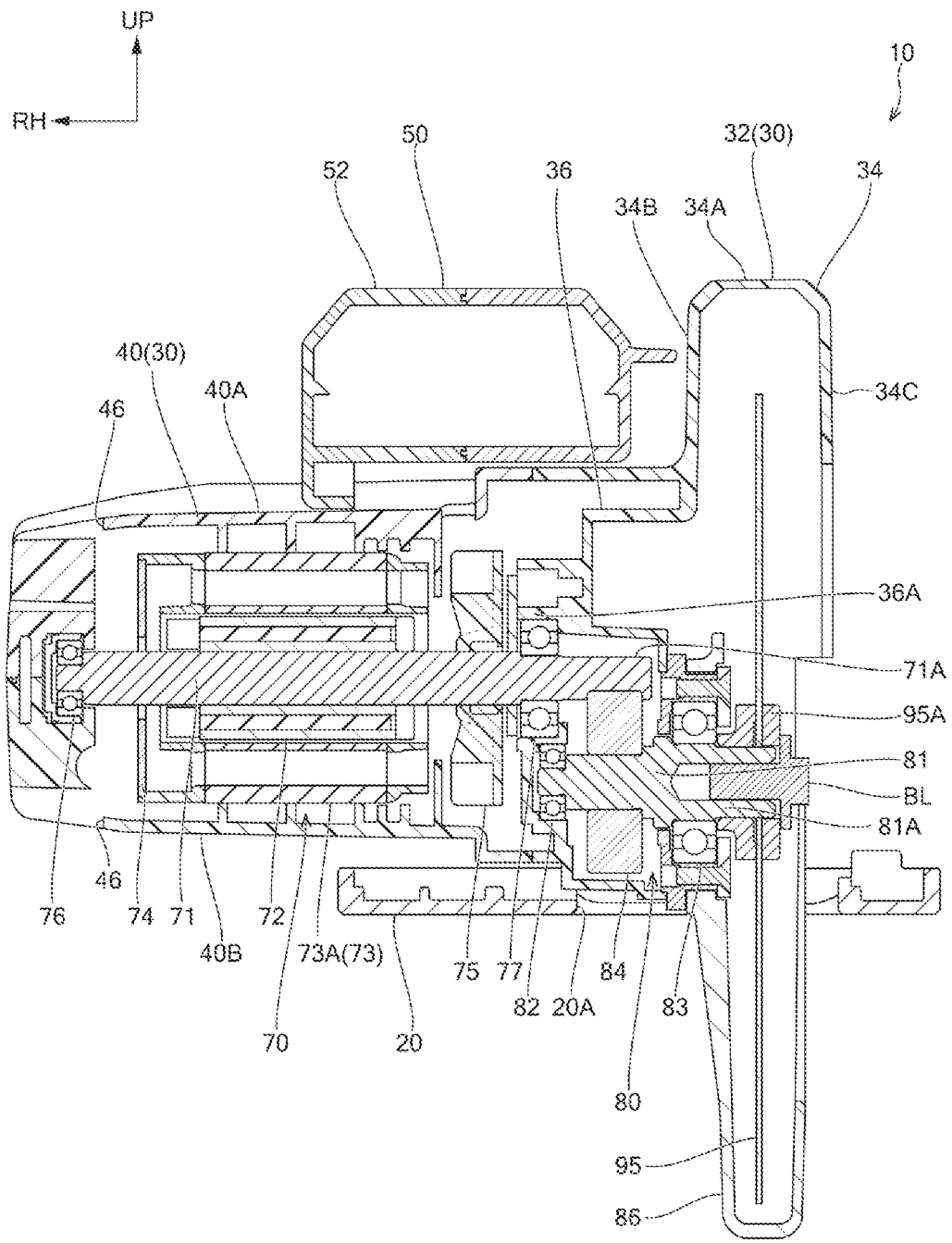
FIG. 9 is a cross-sectional view (cross-sectional view taken along a 9-9 line of FIG. 1) illustrating the inside of the cutting tool shown in FIG. 1 and viewed from a front side.

(Regarding the motor 70) As shown in FIG. 9, the motor 70 is accommodated in the motor housing 40. The motor 70 includes the rotation shaft 71, a rotor 72, and a stator 73. The motor is a brushless motor which does not require a commutator (carbon brush).

The rotation shaft 71 is disposed with the left-right direction as the axial direction. In addition, the right end of the rotation shaft 71 is rotatably supported by a first motor bearing 76 fixed to the motor housing 40, and a left side portion of the rotation shaft 71 is rotatably supported by a second motor bearing 77 fixed to the support tube part 36A of the gear housing part 36. In addition, the left end of the rotation shaft 71 protrudes from the second motor bearing 77 toward the left side, and is disposed inside the support tube part 36A. A pinion gear 71A is formed at the left end of the rotation shaft 71.

The rotor 72 is formed in a substantially cylindrical shape with the left-right direction as the axial direction, disposed on the radially outer side of the rotation shaft 71, and is integrally rotatable with the rotation shaft 71. The stator 73 is formed in a substantially cylindrical shape with the front-rear direction as the axial direction, and is supported by the motor housing 40 on the radially outer side of the rotor 72. The stator 73 has a stator holder 73A, and a stator coil is wound on the stator holder 73A. A motor substrate 74 is fixed to the right end of the stator holder 73A, and the stator coil is connected to the motor substrate 74. In addition, the motor substrate 74 is electrically connected to the controller 90 to be described afterwards by using a lead wire not shown herein.

In the left side portion of the rotation shaft 71, a fan 75 is integrally rotatably provided on the right side of the second motor bearing 77. The fan 75 is a centrifugal fan. Specifically, with the air flow generated by the fan 75, air flows into the motor housing 40 from the intake holes 46 of the motor housing, and the air flow flows toward the radially outer side of the fan 75. Accordingly, the motor 70 is cooled off with the air flow generated by the fan 75.

(Regarding the transmission mechanism 80) The transmission mechanism 80 has the output shaft 81. The output shaft 81 is disposed inside the gear housing part 36 with the left-right direction as the axial direction, and is disposed on the lower side of the rotation shaft 71 of the motor 70. The right end of the output shaft 81 is rotatably supported by the first bearing 82 fixed to the gear housing 36, and the left side portion of the output shaft 81 is rotatably supported by the second bearing 83 fixed to the gear housing 36.

A transmission gear 84 is integrally rotatably provided at the right side portion of the output shaft 81. The transmission gear 84 is engaged with the pinion gear 71A of the rotation shaft 71. In addition, the left end of the output shaft 81 is configured as a tool installation part 81A. The tool installation part 81A is formed in a substantially cylindrical shape, and a male screw is formed in the inner peripheral part of the tool installation part 81A. In addition, by externally inserting a blade installation part 95A of the central part of the saw blade 95 to the tool installation part 81A and screwing a bolt BL to the tool installation part 81A, the saw blade 95 is installed to the tool installation part 81A. Accordingly, with the motor 70 performing driving, the output shaft 81 and the saw blade 95 are configured to rotate around the output shaft 81.

The lower part of the saw blade 95 is covered by a protection cover 86. The protection cover 86, when viewed from the right side, is formed in a semi-circular shape convex toward the lower side and formed in a concave shape open to the upper side. In addition, the protection cover 86 is connected to the output shaft 81 to be rotatable around the output shaft 81. Moreover, the protection cover 86 is biased around the output shaft 81 by a biasing spring not shown herein, and is held at a position shown in FIG. 4. In addition, at the time of performing a cutting process by using the cutting tool 10, due to the processing material, the protection cover 86 rotates against a biasing force of the biasing spring, and the blade part of the saw blade 95 is exposed.

(Regarding the controller 90) As shown in FIGS. 6 and 8, the controller 90 is accommodated in the protect part 56 of the handle 50. The controller 90 has a control substrate 91. The control substrate 91 is formed in a substantially rectangular plate shape with the first inclination direction as the plate thickness direction. The control substrate 91 is disposed inside the substrate holder 92 and held by the substrate holder 92. The control substrate 91 is electrically connected to the switch mechanism 62 and the motor 70. Accordingly, with the trigger 60 performing the pulling operation, the motor 70 drives and the saw blade 95 rotates around the output shaft 81.

(Functions and effects) In the following, the functions and effects of the cutting tool 10 according to the embodiment are described.

When the cutting tool 10 as configured above is used, the battery pack 100 is inserted into the battery accommodation part 55 from the right side, and is installed to the battery attachment and detachment part 42 of the motor housing 40. Accordingly, the connector part 101 of the battery pack 100 is connected to the connector 48 of the battery attachment and detachment part 42. In addition, the base 20 is mounted on the processing material, and a pulling operation is performed on the trigger 60. Accordingly, the motor 70 performs driving, the driving force of the motor 70 is transmitted to the saw blade 95 by the transmission mechanism 80, and the saw blade 95 rotates around the output shaft 81. In addition, by sliding the base 20 on the upper surface of the processing tool 20, a cutting process is performed on the processing material.

Here, the cutting tool 10 includes the housing 30 accommodating the motor 70 and the handle 50 connected to the housing 30. The handle 50 includes the grip part 51 gripped by the operator; the first connection part 52 extending from an end (upper end) of the grip part 51 toward a front side and fixed to the main body housing 32 of the housing 30; and the second connection part 53 extending from the other end (lower end) of the grip part 51 toward the front side and fixed to the main body housing 32. Accordingly, the loop structure S is formed by the housing 30 (a portion of the motor housing 40) and the handle 50. Specifically, the loop structure S is formed by the grip part 51, the first connection part 52, the housing 30, and the second connection part 53. In addition, the battery pack 100 installed to the battery attachment and detachment part 42 of the motor housing 40 is disposed in the loop structure S. In other words, the battery accommodation part 55 for accommodating the battery pack 100 is disposed inside the loop structure S. According to such structure, firstly, the first connection part 52 is located above the battery pack 100, and the second connection part 53 is located below the battery pack 100. Therefore, a foreign matter can be prevented from contacting the battery pack 100 from above or below the battery pack 100. In addition, the battery pack 100 (battery accommodation part 55) is disposed inside the loop structure S. Therefore, the housing 30 and the handle 50 function as a surrounding part surrounding the battery pack 100. Accordingly, for example, in the case where the cutting tool 10 drops in a state in which the battery pack 100 is installed, the battery pack 100 can be prevented from directly hitting the floor. Therefore, the protection performance with respect to the battery pack 100 installed to the battery attachment and detachment part 42 can be facilitated. In addition, the battery attachment and detachment part 42 is provided at the motor housing 40, and the center position of the battery attachment and detachment part 42 is located above and behind the center position of the motor 70. Therefore, the lower end position of the battery pack 100 can be located above the lower end position of the motor housing 40. Accordingly, the assemblability is facilitated by integrating the battery attachment and detachment part 42 with the motor housing 40, and the second connection part 53 is easily provided below the battery pack 100. Moreover, a space for finger insertion below the battery pack 100 can be secured, and the attachment and detachment operation of the battery pack 100 is easy. In the embodiment, the lock member 103 is located on the lower side of the battery pack 100 in the installed state. Therefore, the attachment and detachment operation can be easily performed. In the embodiment, by configuring the housing side rail part 45 on the upper side to be closer to the rotation shaft 71 of the motor 70 in the front-rear direction than the housing side rail part 45 on the lower side when viewed in the left-right direction, the influence of the battery pack 100 on the protrusion amount of the saw blade 95 can be suppressed. In the embodiment, since the lower end of the battery back 100 is located below the center position (rotation shaft 71) of the motor 70 when viewed in the left-right direction. Therefore, the upward protrusion of the battery pack 100 can be suppressed, and a compact configuration is realized. In addition, since the center of the battery pack 100 is located below the upper end of the motor housing 40, the upward protrusion of the battery pack 100 is suppressed.

In addition, in the handle 50, the grip part 51 is disposed behind the rear side of the main body housing 32, more specifically behind the rear end of the base 20, and extends along the second inclination direction when viewed in a side view. In addition, the front end (tip end) of the first connection part 52 is fixed to the saw cover 34 of the main body housing 32, and the front end (tip end) of the second connection part 53 is fixed to the saw cover part 34 of the main body housing 32. Therefore, the two ends of the grip part 51 gripped by the operator in the longitudinal direction can be supported by the main body housing 32. Accordingly, compared with a configuration in which the front end of the second connection part 53 is not fixed to the main body housing 32, the support rigidity of the grip part 51 can be increased. That is, in a mode in which the grip part 51 is located behind the rear end of the base 20, for the connection between the handle 50 and the main body housing 32 on the front side of the grip part 51, the handle 50 can be fixed even by using only the first connection part. However, in the embodiment, since the connection (fixing) is made at two (upper and lower) places, the fixing force of the handle 50 can be appropriately secured. Therefore, the workability with respect to the operator can be facilitated.

In addition, the handle 50 has the protect part 56. The protect part 56, inside the loop structure S, connects the longitudinal intermediate part of the first connection part 52 and the longitudinal intermediate part of the second connection part 53. In addition, the protect part 56 is disposed between the battery pack 100 installed to the battery attachment and detachment part 42 and the grip part 51. Therefore, the unintentional contact of the hand of the operator gripping the gripping part 51 to the battery pack 100 can be suppressed by the protect part 56. In addition, even it is assumed that the hand of the operator slips during the work of the cutting tool 10, the operator's hand can be suppressed from contacting the battery pack 100 by the protect part 56.

In addition, as described above, the protect part 56, inside the loop structure S, connects the longitudinal intermediate part of the first connection part 52 and the longitudinal intermediate part of the second connection part 53. Accordingly, the protect part 56 functions as a reinforcement part of the handle 50. Accordingly, with the protect part 56, the overall rigidity of the handle 50 can be increased. In addition, the front end of the first connection part 52 and the front end of the second connection part 53 are partially connected by the notch part 55A. Accordingly, the overall rigidity of the handle 50 can be further increased.

In addition, the controller 90 is accommodated inside the protect part 56. Accordingly, it is not necessary to accommodate the controller 90 in the first connection part 52 and the second connection part 53. Accordingly, the first connection part 52 and the second connection part 53 can be miniaturized. In addition, by disposing the controller 90 inside the protect part 56, the controller 90 can be disposed between the motor 70 as well as the connector 48 and the switch mechanism 62 (trigger 60) disposed at the grip part 51 of the handle 50. Accordingly, the wiring can be easily wound from the motor 70, the connector 42, and the switch mechanism 62 to the controller 90.

In addition, the saw blade 95 is formed in a circular plate shape with the left-right direction as the plate thickness direction. Moreover, the grip part 51, the first connection part 52, and the second connection part 53 of the handle 50 extends along a direction orthogonal to the axial direction of the motor 70 when viewed in a plan view. Accordingly, the grip part 51, the first connection part 52, and the second connection part 53 extend parallel to the side surface of the saw blade 95. Accordingly, the increase in size of the handle 50 in the left-right direction can be suppressed, and the increase in size of the cutting tool 10 in the left-right direction can be suppressed.

In addition, the housing 30 includes the main body housing 32 accommodating the saw blade 95 and the motor housing 40 accommodating the motor 70, and the motor housing 40 is fixed to the main body housing 32. In addition, the first connection part 52 and the second connection part 53 of the handle 50 are fixed to the main body housing 32, and the battery attachment and detachment part 42 is provided at the motor housing 40. That is, in the housing 30, the housing to which the handle 50 is fixed and the housing where the battery attachment and detachment part 42 is provided are separate housings. In other words, the handle 50 (handle housing) and the motor housing 40 having the battery attachment and detachment part 42, which are separate components, are connected to each other via the main body housing 32 supporting the saw blade 95. Accordingly, for example, when an impact is input to the handle 50 due to dropping, etc., such impact is mainly transmitted to the main body housing 32. Therefore, the transmission of the impact to the motor housing 40 can be suppressed. Thus, the protection performance with respect to the battery pack 100 installed to the battery attachment and detachment part 42 can be further facilitated.

In addition, when viewed in the left-right direction, the motor 70, the battery attachment and detachment part 42 of the motor housing 40, and the grip part 51 of the handle 50 are arranged side-by-side in this order toward the side in the first inclination direction, and the base 20 are disposed on the lower side of the motor housing 40 and the handle 50. Accordingly, the battery attachment and detachment part 42 can be disposed apart from the upper side of the base 20. Therefore, the front end of the second connection part 53 of the handle 50 can be disposed on the lower side of the battery attachment and detachment part 42 and fixed to the main body housing 32.

In addition, the motor housing 40 is formed by the split housing parts 40A and 40B split in the second inclination direction. The housing side rail parts 45 are respectively formed on the split housing parts 40A and 40B, and form a portion of the battery attachment and detachment part 42. Accordingly, in the motor housing 40, the housing side rail parts 45 can be formed easily.

In addition, the concave battery accommodation part 55 open to the right side is formed in the handle 50, and the battery accommodation part 55 is disposed on the upper side of the top end in the second connection part 53 of the handle 50. That is, the battery accommodation part 55 and the battery pack 100 can be disposed apart from the upper side of the base 20. In other words, a gap can be provided between the battery pack 100 and the base 20. Accordingly, the finger of the operator can be inserted into the gap to grip the battery pack 100. Moreover, in the state in which the battery pack 100 is accommodated in the battery accommodation part 55, the lock members 103 of the battery pack 100 are disposed on the side parts on the two sides of the battery pack 100 in the second inclination direction. Accordingly, the lock members 103 are exposed by the gap G between the battery pack 100 and the base 20. Therefore, even if the battery pack 100 is installed from the right side, the removal performance of the battery pack 100 can be facilitated.

In addition, in the state in which the battery pack 100 is accommodated in the battery accommodation part 55, the depth dimension of the battery pack accommodation part 55 is set so that the lock member 103 of the battery pack 100 is exposed to the outside of the battery accommodation part 55. Accordingly, the removal performance of the battery pack 100 can be further facilitated. In addition, in the state in which the battery pack 100 is accommodated in the battery accommodation part 55, the depth dimension of the battery accommodation part 55 is set, so that the right end of the battery pack 100 does not protrude rightward with respect to the right end of the motor housing 40. Accordingly, the protection performance with respect to the battery pack 100 is maintained, while the battery accommodation part 55 can be formed in the handle 50.

In addition, when viewed from the second inclination direction, the scooped part 43 open to the right side and the side in the first inclination direction is formed at the right end of the motor housing 40, and the battery accommodation part 55 of the handle 50 is disposed on a side of the motor housing 40 in the first inclination direction. Accordingly, when the battery pack 100 is accommodated in the battery accommodation part 55, the hand of the operator can be arranged in the scooped part 43 to grip the battery pack 100. Therefore, the installability of the battery pack 100 can be facilitated.

Moreover, on the sidewalls at the left and the right of the handle 50, the bending edges 58 extending along the second inclination direction are formed at a portion of the protect part 56, and the bending edges 58 extend from the first connection part 52 to the second connection part 53. Accordingly, the function of reinforcing the handle 50 by the protect part 56 can be effectively facilitated.

Moreover, when an impact force is input to the grip part 51 of the handle 50 due to dropping, etc., the impact force can be transmitted to the outer peripheral parts of the first connection part 52 and the second connection part 53 along the bending edges 58. That is, the impact force can be spread to the outer peripheral parts of the first connection part 52 and the second connection part 53 through the bending edges 58. Therefore, the transmission of the impact force to the motor housing 40 and the battery attachment and detachment part 42 can be effectively suppressed.

What is claimed is:

1. A work machine, comprising:
a motor, comprising a rotation shaft that rotates around an axis extending in a left-right direction;
an output shaft, that is driven by the motor;
a main body housing, accommodating at least a part of the output shaft;
a motor housing, accommodating the motor, the motor housing being fixed to the main body housing;
a handle, connected to the main body housing; and
a battery attachment and detachment part, provided at the motor housing, wherein a battery supplying power to the motor is detachably installed to the battery attachment and detachment part,
wherein the handle comprises:
a grip part, grippable by an operator;
a first connection part, extending from an end of the grip part toward a side of the housing and connected to the housing;
a second connection part, extending from an other end of the grip part toward the side of the housing and connected to the housing,
wherein at least a part of the first connection part is located above the battery, and at least a part of the second connection part is located below the battery so as to be overlapped to the battery in an upper-lower direction,
wherein the motor housing comprises:
a motor accommodation part that accommodates the motor;
a fixing part, disposed at one side end of the motor housing in the left-right direction, the fixing part fixing the motor accommodation part to the main body housing,
wherein a battery holding part is connected to the main body housing via the fixing part, and the handle is connected to the main body housing without the fixing part.

2. The work machine as claimed in claim 1,
wherein the output shaft extends in the left-right direction,
wherein a loop structure is formed by the handle and the housing, and the battery installed to the battery attachment and detachment part is disposed inside the loop structure such that a long side intersects a front-rear direction.

3. The work machine as claimed in claim 1, wherein the handle has a protect part, the protect part connects the first connection part and the second connection part in the upper-lower direction, and is disposed between the battery installed to the battery attachment and detachment part and the grip part.

4. The work machine as claimed in claim 3, wherein a controller controlling the motor is accommodated inside the protect part.

5. The work machine as claimed in claim 1, comprising a tip tool connected to the motor and rotated by the motor,
wherein the tip tool is formed in a circular plate shape with an axial direction of the motor as a plate thickness direction,
the grip part, the first connection part, and the second connection part, when viewed in a plan view, extend along a direction orthogonal to the axial direction of the motor.

6. The work machine as claimed in claim 1, wherein a direction orthogonal to an upper-lower direction is set as a first direction, and a direction orthogonal to the first direction and the upper-lower direction is set as a second direction,
the motor is configured with the first direction as an axial direction,
when viewed in the first direction, the motor, the battery attachment and detachment part, and the grip part are disposed in order along a first inclination direction inclined upward toward a side of the second direction, and
a base slidable on a processing material is disposed on a lower side of the motor and the handle.

7. The work machine as claimed in claim 6, wherein the motor housing, when viewed in the first direction, is formed by split housing parts split in a second inclination direction orthogonal to the first inclination direction, and
a pair of housing side rail parts forming a portion of the battery attachment and detachment part and locked with the battery are provided in the split housing parts.

8. The work machine as claimed in claim 1, wherein the battery attachment and detachment part has two battery support parts,
one of the battery support parts located on an upper side is closer to a center position of the motor in a front-rear direction than an other of the battery support parts located on a lower side.

9. The work machine as claimed in claim 8, wherein the battery support part is a rail part extending in a left-right direction.

10. The work machine as claimed in claim 9, wherein the battery attachment and detachment part supports the battery so that a lower end of the battery is located above a lower end of the motor housing.

11. The work machine as claimed in claim 1, wherein the battery is configured to be detachably attachable to the battery attachment and detachment part by sliding at a rear of the motor housing in an intersecting direction which is a direction that intersects the front-rear direction.

12. The work machine as claimed in claim 11, wherein intersecting direction is the left-right direction.

13. The work machine as claimed in claim 1, wherein the handle covers a portion of a side surface of the battery that faces the left-right direction.

14. The work machine as claimed in claim 1, wherein a center position of the battery in the left-right direction of the side surface portion is offset in the left-right direction with respect to the center position of the grip part in the left-right direction.

15. The work machine as claimed in claim 1, wherein the battery attachment and detachment part includes a pair of rails that supports the battery, and
in plan view, the pair of rails is hidden from view by the handle.

16. The work machine as claimed in claim 1, wherein a part of the handle is located forward of an axial center of the rotation shaft.

17. The work machine as claimed in claim 1, wherein the first connection part and the second connection part are connected the main body housing so as to sandwich the motor housing in the upper-lower direction.

18. A work machine, comprising:
a motor housing, accommodating a motor;
a circular saw blade, rotated by the motor around an axis extending in a left-right direction;
a base, located below the motor housing, and having an insertion hole allowing at least a portion of the circular saw blade to protrude downward;
a handle, connected to the motor housing; and
a battery attachment and detachment part, provided at the motor housing, wherein a substantially rectangular parallelepiped shape battery supplying power to the motor is detachably installed to the battery attachment and detachment part,
wherein the battery attachment and detachment part is provided with a connector that is electrically connected with the battery,
wherein the battery includes a side surface part having a connector part that is electrically connected with the connector,
wherein the battery attachment and detachment part is disposed on a side surface part at a rear side of the motor housing, and the battery attachment and detachment part is configured to support the battery such that the side surface part of the battery faces a lower front direction.

19. The work machine as claimed in claim 18, wherein the battery attachment and detachment part has two battery support parts,
one of the battery support parts located on an upper side is closer to a center position of the motor in a front-rear direction than an other of the battery support parts located on a lower side.

20. The work machine as claimed in claim 19, wherein the battery support part is a rail part extending in a left-right direction.

21. The work machine as claimed in claim 20, wherein the battery attachment and detachment part supports the battery so that a lower end of the battery is located above a lower end of the motor housing.

22. The work machine as claimed in claim 18, wherein the battery attachment and detachment part includes a pair of rails that supports the battery, and
the pair of rails are separated from each other in an upper-lower direction,
an upper rail among the pair of rails is more forward relative to a lower rail among the pair of rails.

23. A work machine, comprising:
a motor, comprising a rotation shaft that rotates around an axis extending in a left-right direction;
an output shaft, that is driven by the motor;
a main body housing, accommodating at least a part of the output shaft;
a motor housing, accommodating the motor, the motor housing being fixed to the main body housing;
a handle, connected to the main body housing; and
a battery attachment and detachment part, provided at the motor housing, wherein a battery supplying power to the motor is detachably installed to the battery attachment and detachment part,
wherein the handle comprises:
a grip part, grippable by an operator;
a first connection part, extending from an end of the grip part toward a side of the housing and connected to the housing;
a second connection part, extending from an other end of the grip part toward the side of the housing and connected to the housing,
wherein at least a part of the first connection part is located above the battery, and at least a part of the second connection part is located below the battery so as to be overlapped to the battery in an upper-lower direction,
wherein a direction orthogonal to an upper-lower direction is set as a first direction, and a direction orthogonal to the first direction and the upper-lower direction is set as a second direction,
the motor is configured with the first direction as an axial direction,
when viewed in the first direction, the motor, the battery attachment and detachment part, and the grip part are disposed in order along a first inclination direction inclined upward toward a side of the second direction, and
a base slidable on a processing material is disposed on a lower side of the motor and the handle.

* * * * *